United States Patent
Hoover et al.

(10) Patent No.: US 8,370,416 B2
(45) Date of Patent: Feb. 5, 2013

(54) COMPATIBILITY ENFORCEMENT IN CLUSTERED COMPUTING SYSTEMS

(75) Inventors: David J. Hoover, Roseville, CA (US); Bernard A. Reed, III, Colorado Springs, CO (US); Marjorie Krueger, Roseville, CA (US); Douglas L. Voigt, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1351 days.

(21) Appl. No.: 11/411,732

(22) Filed: Apr. 26, 2006

(65) Prior Publication Data

US 2007/0255813 A1    Nov. 1, 2007

(51) Int. Cl.
*G06F 15/16*    (2006.01)

(52) U.S. Cl. ........ 709/201; 709/203; 709/226; 707/610; 707/694; 718/100

(58) Field of Classification Search .................. 709/201, 709/203, 226; 717/177; 707/610, 694, 827; 718/100
See application file for complete search history.

(56) References Cited

U.S. PATENT DOCUMENTS

| | | | |
|---|---|---|---|
| 6,785,713 B1 * | 8/2004 | Freeman et al. | 709/208 |
| 6,788,648 B1 | 9/2004 | Peterson | |
| 6,959,320 B2 * | 10/2005 | Shah et al. | 709/203 |
| 7,035,918 B1 * | 4/2006 | Redding et al. | 709/223 |
| 7,711,647 B2 * | 5/2010 | Gunaseelan et al. | 705/59 |
| 8,010,513 B2 * | 8/2011 | Zhang et al. | 707/694 |
| 8,069,119 B2 * | 11/2011 | Curren | 705/59 |
| 2001/0049717 A1 * | 12/2001 | Freeman et al. | 709/203 |
| 2003/0126202 A1 * | 7/2003 | Watt | 709/203 |
| 2003/0144854 A1 | 7/2003 | Macholda | |
| 2003/0187983 A1 | 10/2003 | Rajic | |
| 2003/0233439 A1 | 12/2003 | Stone | |
| 2004/0193861 A1 | 9/2004 | Michaelis | |
| 2005/0022173 A1 | 1/2005 | Kanade | |
| 2005/0234846 A1 * | 10/2005 | Davidson et al. | 707/1 |
| 2006/0036894 A1 * | 2/2006 | Bauer et al. | 714/4 |
| 2006/0106728 A1 * | 5/2006 | Yellai et al. | 705/59 |
| 2006/0282519 A1 | 12/2006 | Trevathan | |
| 2009/0276771 A1 * | 11/2009 | Nickolov et al. | 717/177 |
| 2011/0145328 A1 * | 6/2011 | Wang et al. | 709/203 |
| 2011/0153697 A1 * | 6/2011 | Nickolov et al. | 707/827 |

(Continued)

FOREIGN PATENT DOCUMENTS

| | | |
|---|---|---|
| GB | 2362969 | 12/2001 |
| JP | H07-141305 A | 6/1995 |

(Continued)

OTHER PUBLICATIONS

UK Search Report.

(Continued)

*Primary Examiner* — Thu Ha Nguyen

(57) ABSTRACT

In one embodiment a method of creating a clustered computing system, comprises storing license information for a computing cluster in a memory module associated with a computing node, wherein the licensing information includes a bundle-type parameter that identifies a characteristic of the cluster and one or more node license parameters that identifies a characteristic of a computing node, initializing the computing cluster in a first computing node, adding one or more available computing nodes to the computing cluster; and activating the computing cluster when the computing cluster includes a number of nodes that complies with the bundle-type parameter.

18 Claims, 6 Drawing Sheets

U.S. PATENT DOCUMENTS

| | | | |
|---|---|---|---|
| 2011/0179112 A1* | 7/2011 | Ravichandran et al. | 709/203 |
| 2011/0251992 A1* | 10/2011 | Bethlehem et al. | 707/610 |
| 2011/0276699 A1* | 11/2011 | Pedersen | 709/227 |
| 2011/0307548 A1* | 12/2011 | Fisk et al. | 709/203 |
| 2012/0011514 A1* | 1/2012 | Burton et al. | 718/100 |

FOREIGN PATENT DOCUMENTS

| | | |
|---|---|---|
| JP | H09-171502 A | 6/1997 |
| JP | 2003-323224 A | 11/2003 |
| JP | 2004-215064 A | 7/2004 |
| JP | 2004-234559 A | 8/2004 |
| JP | 2005-235019 A | 9/2005 |
| WO | WO9939269 | 8/1999 |

OTHER PUBLICATIONS

Japanese Notice of Rejection in corresponding Japanese patent application No. 2007-115272, dated Mar. 12, 2010, English translation.
English translation of Japanese Notice of Rejection in corresponding Japanese Patent Application No. 2007-115272, dated Jul. 5, 2010.

* cited by examiner

US 8,370,416 B2

COMPATIBILITY ENFORCEMENT IN CLUSTERED COMPUTING SYSTEMS

TECHNICAL FIELD

This application relates to electronic computing, and more particularly to compatibility enforcement in clustered computing systems.

BACKGROUND

The term "clustered computing system" refers to a computing system formed from a group of loosely coupled computing devices that cooperate to provide the appearance that the devices function as a single system. Clustering technology permits users to construct a variety of computing system configurations using elemental building blocks, and to change configurations or components of a clustered system as part of maintenance or update routines. By way of example, a high-capacity storage system may be constructed from a cluster of individual storage components. Similarly, a grid computer may be constructed from a cluster of individual computing components.

Computing systems and products created using clustering technology present particular technical issues. Technical issues include ensuring compatibility between hardware, software and firmware operating on clustered devices and ensuring compliance with licensing terms associated with individual computing devices and with cluster configurations.

SUMMARY

In one embodiment a method of creating a clustered computing system, comprises storing license information for a computing cluster in a memory module associated with a computing node, wherein the licensing information includes a bundle-type parameter that identifies a characteristic of the cluster and one or more node license parameters that identifies a characteristic of a computing node, initializing the computing cluster in a first computing node, adding one or more available computing nodes to the computing cluster; and activating the computing cluster when the computing cluster includes a number of nodes that complies with the rules associated with the bundle-type parameter.

DETAILED DESCRIPTION

Described herein are exemplary systems and methods for compatibility enforcement in clustered computing systems. Certain methods described herein may be embodied as logic instructions and associated data on a computer-readable medium. When executed on one or more processors, the logic instructions cause the processor(s) to be programmed as a special-purpose machine that implements the described methods. The processor(s), when configured by the logic instructions to execute the methods recited herein, may constitute structure for performing the described methods.

In embodiments, subject matter described herein may be implemented in a storage architecture that provides data storage at a system level, such as, e.g., a storage area network (SAN). In implementations described herein, computing systems that utilize storage are referred to as hosts. For example, a host may be a supercomputer processing large databases, a transaction processing server maintaining transaction records, and the like. Alternatively, the host may be a file server on a local area network (LAN) or wide area network (WAN) that provides storage services for an enterprise.

In a direct-attached storage solution, a host may include one or more disk controllers or RAID controllers configured to manage multiple directly attached disk drives. By contrast, in a SAN a host connects to the SAN in accordance via a high-speed connection technology such as, e.g., a fibre channel (FC) fabric in the particular examples.

A virtualized SAN architecture may comprise one or more storage cells, where each storage cell comprises a group of storage devices called a disk group. Each storage cell comprises parallel storage controllers coupled to the disk group. The storage controllers may be coupled to the storage devices using a fibre channel arbitrated loop connection, or through a network such as a fibre channel fabric or the like. The storage controllers may also be coupled to each other through point-to-point connections to enable them to manage the presentation of storage capacity to computers using the storage capacity.

Network architectures described herein represent a distributed computing environment such as, e.g., an enterprise computing system using a private SAN. However, the network architectures may be readily scaled upwardly or downwardly to meet the needs of a particular application.

Figure 1:
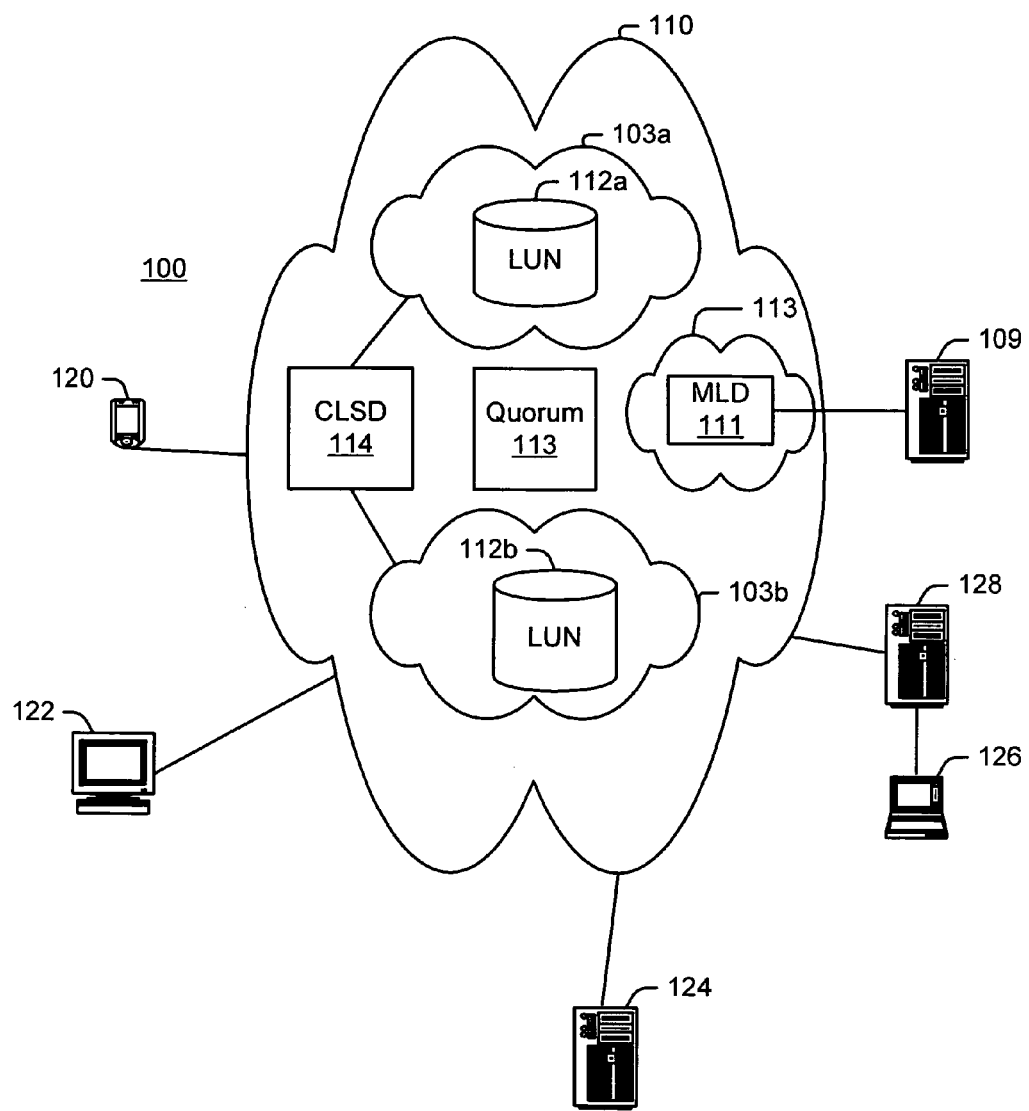
FIG. 1 is a schematic illustration of a networked computing system that utilizes a storage network.

FIG. 1 is a schematic illustration of one embodiment of a networked computing system 100 that utilizes a storage network. In one embodiment, storage pool 110 may be implemented as a virtualized storage pool as described in published U.S. Patent Application Publication No. 2003/0079102 to Lubbers, et al., or as described in U.S. Patent Application No. 2005/0172073 to Voigt, et al., the disclosures of which is incorporated herein by reference in its entirety.

A plurality of logical disks (also called logical units, LUs or sometimes LUNs) 112a, 112b may be allocated within storage pool 110. Each LUN 112a, 112b comprises a contiguous range of logical addresses that can be addressed by host devices 120, 122, 124 and 128 by mapping requests from the connection protocol used by the host device to the uniquely identified LUN 112a, 112b. A host such as server 128 may provide services to other computing or data processing systems or devices. For example, client computer 126 may access storage pool 110 via a host such as server 128. Server 128 may provide file services to client 126, and may provide other services such as transaction processing services, email services, etc. Hence, client device 126 may or may not directly use the storage consumed by host 128.

Devices such as wireless device 120, and computers 122, 124, which also may serve as hosts, may logically couple directly to LUNs 112a, 112b. Hosts 120-128 may couple to multiple LUNs 112a, 112b, and LUNs 112a, 112b may be shared among multiple hosts. Each of the devices shown in FIG. 1 may include memory, mass storage, and a degree of data processing capability sufficient to manage a network connection.

A LUN such as LUN 112a, 112b comprises one or more redundant stores (RStore) which are a fundamental unit of reliable storage. An RStore comprises an ordered set of physical storage segments (PSEGs) with associated redundancy properties and is contained entirely within a single redundant store set (RSS). By analogy to conventional storage systems, PSEGs are analogous to disk drives and each RSS is analogous to a RAID storage set comprising a plurality of drives.

The PSEGs that implements a particular LUN may be spread across any number of physical storage disks. Moreover, the physical storage capacity that a particular LUN 102 represents may be configured to implement a variety of storage types offering varying capacity, reliability and availability features. For example, some LUNs may represent striped, mirrored and/or parity-protected storage. Other LUNs may represent storage capacity that is configured without striping, redundancy or parity protection.

A SAN manager appliance 109 is coupled to a management logical disk set (MLD) 111 which is a metadata container describing the logical structures used to create LUNs 112a, 112b, Logical Device Allocation Domains (LDADs) 103a, 103b, and other logical structures used by the system. A portion of the physical storage capacity available in storage pool 110 is reserved as quorum space 113 and cannot be allocated to LDADs 103a, 103b, and hence cannot be used to implement LUNs 112a, 112b. In a particular example, each physical disk that participates in storage pool 110 has a reserved amount of capacity (e.g., the first "n" physical sectors) that may be designated as quorum space 113. MLD 111 is mirrored in this quorum space of multiple physical drives and so can be accessed even if a drive fails. In a particular example, at least one physical drive is associated with each LDAD 103a, 103b includes a copy of MLD 111 (designated a "quorum drive SAN management appliance 109 may wish to associate information such as name strings for LDADs 103a, 103b and LUNs 112a, 112b, and timestamps for object birthdates. To facilitate this behavior, the management agent uses MLD 111 to store this information as metadata.

Quorum space 113 may be used to store information including physical store ID (a unique ID for each physical drive), version control information, type (quorum/non-quorum), RSS ID (identifies to which RSS this disk belongs), RSS Offset (identifies this disk's relative position in the RSS), Storage Cell ID (identifies to which storage cell this disk belongs), PSEG size, as well as state information indicating whether the disk is a quorum disk, for example. This metadata PSEG also contains a PSEG free list for the entire physical store, probably in the form of an allocation bitmap. Additionally, quorum space 113 contains the PSEG allocation records (PSARs) for every PSEG on the physical disk. The PSAR comprises a PSAR signature, Metadata version, PSAR usage, and an indication a RSD to which this PSEG belongs.

CSLD 114 is another type of metadata container comprising logical drives that are allocated out of address space within each LDAD 103a, 103b, but that, unlike LUNs 112a, 112b, may span multiple LDADs 103a, 103b. Preferably, each LDAD 103a, 103b includes space allocated to CSLD 114. CSLD 114 holds metadata describing the logical structure of a given LDAD 103, including a primary logical disk metadata container (PLDMC) that contains an array of descriptors (called RSDMs) that describe every RStore used by each LUN 112a, 112b implemented within the LDAD 103a, 103b. The CSLD 114 implements metadata that is regularly used for tasks such as disk creation, leveling, RSS merging, RSS splitting, and regeneration. This metadata includes state information for each physical disk that indicates whether the physical disk is "Normal" (i.e., operating as expected), "Missing" (i.e., unavailable), "Merging" (i.e., a missing drive that has reappeared and must be normalized before use), "Replace" (i.e., the drive is marked for removal and data must be copied to a distributed spare), and "Regen" (i.e., the drive is unavailable and requires regeneration of its data to a distributed spare).

A logical disk directory (LDDIR) data structure in CSLD 114 is a directory of all LUNs 112a, 112b in any LDAD 103a, 103b. An entry in the Logical Disk Directory Structure (LDDS) comprises a universally unique ID (UUID) an RSD indicating the location of a Primary Logical Disk Metadata Container (PLDMC) for that LUN 102. The RSD is a pointer to the base RSDM or entry point for the corresponding LUN 112a, 112b. In this manner, metadata specific to a particular LUN 112a, 112b can be accessed by indexing into the LDDIR to find the base RSDM of the particular LUN 112a, 112b. Metadata within the PLDMC (e.g., mapping structures described herein) can be loaded into memory to realize the particular LUN 112a, 112b.

Hence, the storage pool depicted in FIG. 1 implements multiple forms of metadata that can be used for recovery. The CSLD 111 implements metadata that is regularly used for tasks such as disk creation, leveling, RSS merging, RSS splitting, and regeneration. The PSAR metadata held in a known location on each disk contains metadata in a more rudimentary form that is not mapped into memory, but can be accessed when needed from its known location to regenerate all metadata in the system.

Each of the devices shown in FIG. 1 may include memory, mass storage, and a degree of data processing capability sufficient to manage a network connection. The computer program devices in accordance with the present invention are implemented in the memory of the various devices shown in FIG. 1 and enabled by the data processing capability of the devices shown in FIG. 1.

Figure 2:
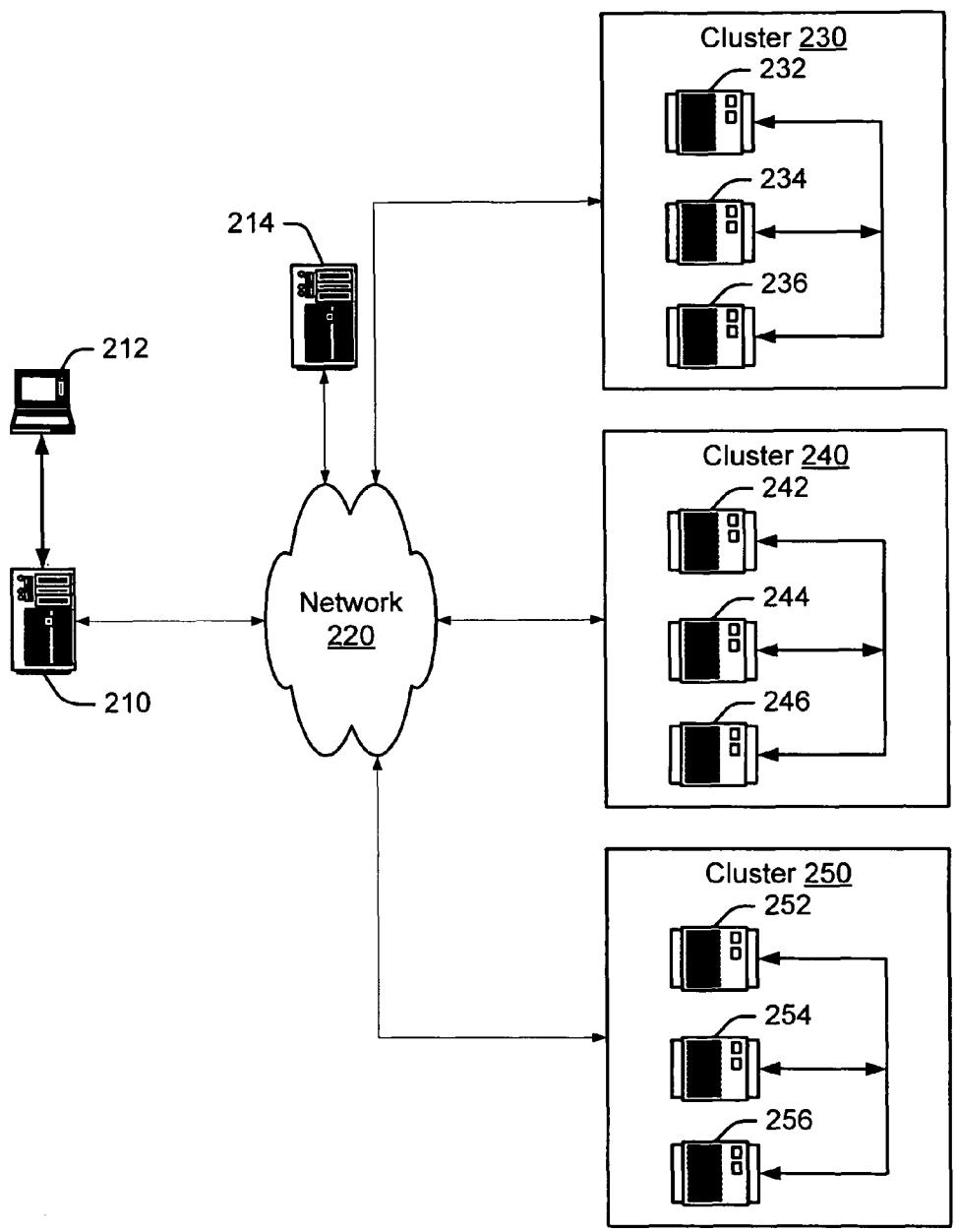
FIG. 2 is a schematic illustration of physical elements of a storage network according to an embodiment.

FIG. 2 is a schematic illustration of physical elements of a storage network 200 that may be used to implement a storage network such the network depicted in FIG. 1. Storage network 200 comprises a plurality of clusters 230, 240, 250, which may be implemented as one or more communicatively connected storage nodes. Thus, cluster 230 includes storage nodes 232, 234, 236. Cluster 240 includes nodes 242, 244, 246. Cluster 250 includes nodes 252, 254, 256. Each node may include one or more storage devices such as, e.g., an array of storage devices. Exemplary storage devices include the STORAGEWORKS line of storage devices commercially available form Hewlett-Packard Corporation of Palo Alto, Calif., USA.

Network 200 may further include one or more host computers 210 coupled to clusters 230, 240, 250 via a communication network 220. Communication network 220 may be implemented as a private, dedicated network such as, e.g., a Fibre Channel (FC) switching fabric. Alternatively, portions of communication network 220 may be implemented using public communication networks pursuant to a suitable communication protocol such as, e.g., the Internet Small Computer Serial Interface (iSCSI) protocol.

One or more client computers 212 may access resources provided by storage clusters 230, 240, 250 through host 210. In operation, one or more client computers 212 generate a request to host computer 210 for a resource provided by one or more of storage clusters 230, 240, 250. Host computer 210 generates a resource request to one or more of clusters 230, 240, 250 for the requested resource(s). One or more of clusters 230, 240, 250 process the resource request, and return the requested resource(s) to host 210, which in turn forwards the requested resource to client computer(s) 212.

Storage network 200 may further comprise a compatibility server 214 that maintains compatibility information relating to components of storage network 200. Compatibility information may include information relating to, e.g., firmware versions and/or revisions, and licensing information.

Figure 3:
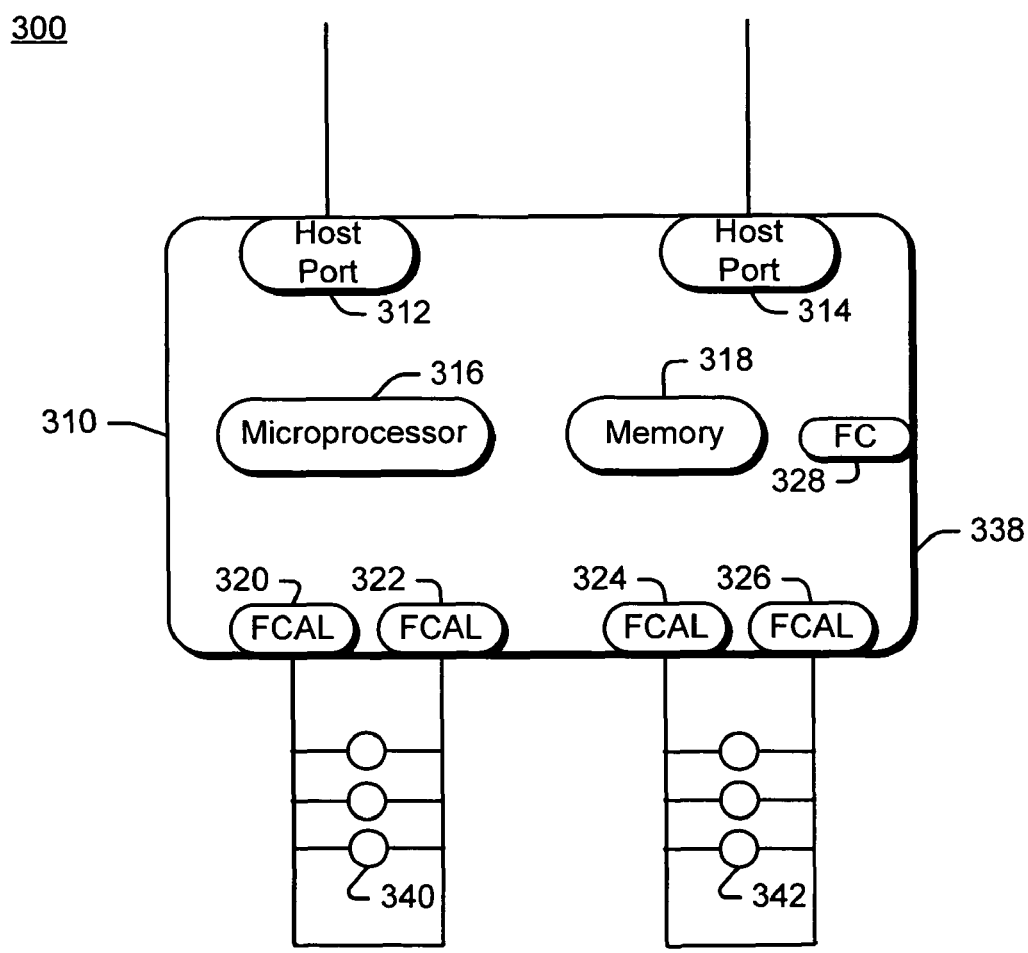
FIG. 3 is a schematic illustration of a storage node according to an embodiment.

FIG. 3 is a schematic illustration of an exemplary implementation of a storage node 300 that may be used in a cluster such as cluster 230, 240, 250. Referring to FIG. 3, in one embodiment each storage node 300 includes one or more Network Storage Controllers (NSCs) 310, also referred to as disk array controllers or storage controllers, to manage the operations and the transfer of data to and from one or more disk drives 340, 342. NSCs 310 may be implemented as plug-in cards having a microprocessor 316, and memory 318. Each NSC 310 includes one or more host adapter ports 312, 314 that provide an interface to a host such as host 210, i.e., through a communication network such as a switching fabric. In a Fibre Channel implementation, host adapter ports 312, 314, may be implemented as FC N_Ports. Each host adapter port 312, 314 manages the login and interface with a switching fabric, and is assigned a fabric-unique port ID in the login process.

In an exemplary implementation, NSC 310 further includes one or more Fiber Channel Arbitrated Loop (FCAL) ports 320, 322, 234, 326 that implement an FCAL communication connection with a plurality of storage devices, e.g., arrays of disk drives 340, 342. While the illustrated embodiment implement FCAL connections with the arrays of disk drives 340, 342, it will be understood that the communication connection with arrays of disk drives 340, 342 may be implemented using other communication protocols. For example, rather than an FCAL configuration, a FC switching fabric or a small computer serial interface (SCSI) connection may be used.

In embodiments, a clustered computing system such as the clustered storage devices depicted in FIGS. 1-3 may be adapted to implement compatibility enforcement between components in the system. As used herein, compatibility enforcement may include compatibility between hardware, software, firmware, and/or licensing requirements. In one embodiment, a clustered computing system implements a licensing scheme that ensures licensing compliance at both the component level and at the system level. The licensing scheme may implement a multi-tiered (or bundled) license program. The first part of the license scheme defines a permissible size range for a cluster. In one embodiment, clusters may be categorized into multiple size ranges, referred to herein as bundle-types. In alternate embodiments, clusters may be categorized into bundle types by one or more additional parameters such as, e.g., an array, tape, computing, translating functional bundle. For example, a bundle may refer to a sales bundle. A bundle may be sold as a set or group of node or grid types to meet a specific market or function. For example, a product category may include one or more bundle sizes that served a single purpose such as, e.g., array/LUN purpose. Bundles may have a specific homogeneous purpose along with standard grid parameters such as, e.g., right to use, maximum and minimum node counts, and a specific array type functional brand. Other bundles may have different characteristics within those listed above, for example, the purpose or function. A bundle may have multipurpose or multiple different single purposed nodes in one bundle. The second part of the license scheme permits the cluster to permanently associate a license and bundle-type with a defined number of nodes as they join the cluster.

Figure 4:
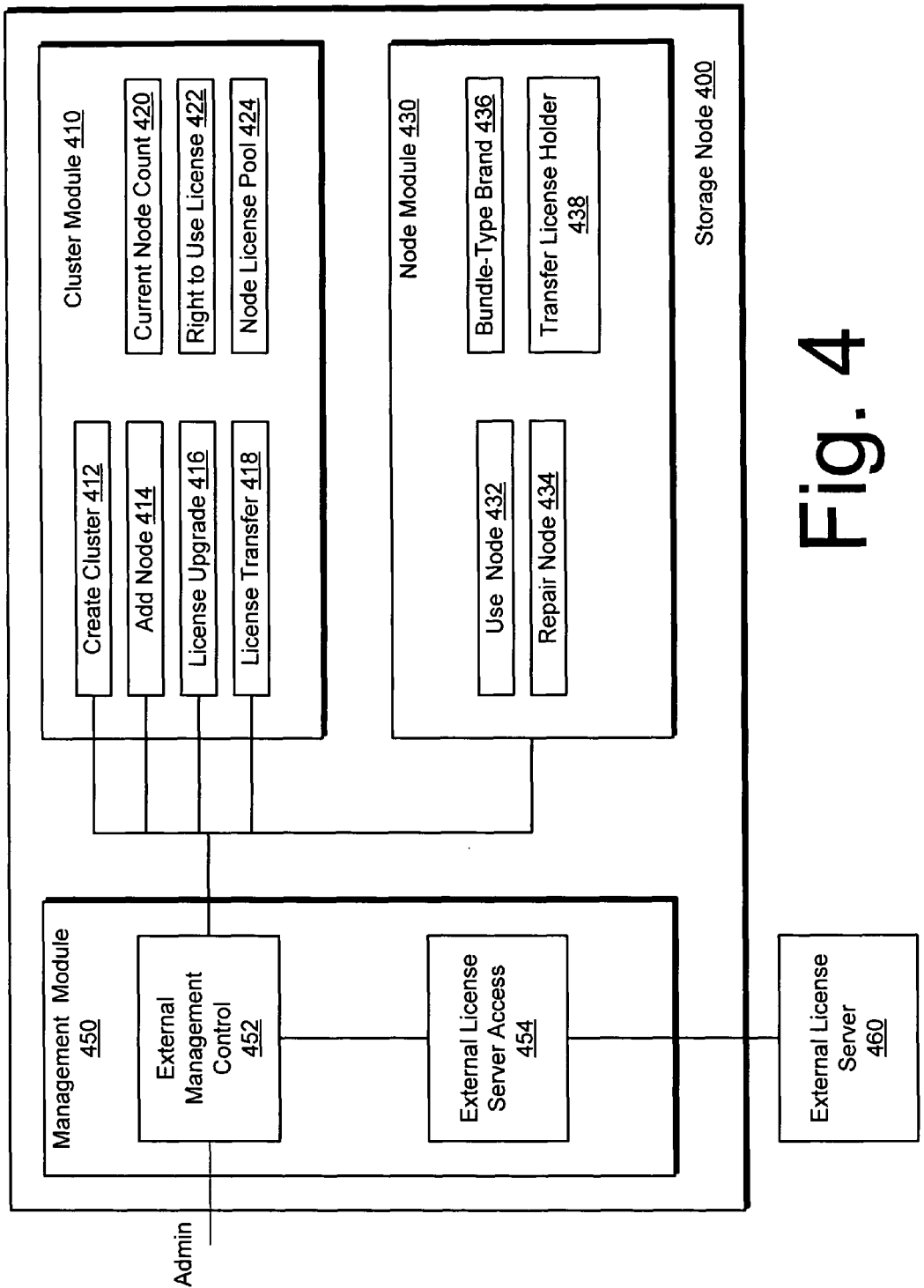
FIG. 4 is a schematic illustration of a logic architecture for compatibility enforcement in clustered computing systems according to an embodiment.

FIG. 4 is a schematic illustration of a logic architecture for compatibility enforcement in clustered computing systems according to an embodiment. In one embodiment, the clustered computing system may correspond to one or more of the storage nodes in the clusters 230, 240, 250 of FIG. 2. The logic modules in storage node 400 may be embodied as software or firmware stored in a computer readable medium such as, e.g., the memory 318 of a storage array controller 300 and executable by a processor such as microprocessor 316 of array controller 300.

Referring to FIG. 4, storage node 400 includes a cluster module 410 that includes logic to manage cluster-level compatibility functions. Cluster module 410 includes a create cluster module 412, an add node module 414, a license upgrade module 416, and a license transfer module 418 which permits removal of a node that is not part of a base bundle. Cluster module further includes a current node count data structure 420 that holds the current number of valid nodes in the cluster, a right to use license data structure 422. In one embodiment, the right to use license may include a token that is conferred by a license management system. The token may include license management specific information for authenticating the license and an indication of a bundle type and the maximum or minimum number of nodes that can be included in the cluster. Cluster module 420 further includes a node license pool 424. In one embodiment, node license pool 424 comprises a pool of tokens conferred on the cluster by a license management system. Each token in the pool includes license management specific information for authenticating the license. The tokens are consumed as they are assigned to nodes to enable nodes to join the cluster. Tokens may be associated with a unique identifier for the node that has been assigned each node license by the cluster.

Storage node 400 further includes a node module 430 that includes logic to manage node-level compatibility functions. Node module 430 includes a use node 432 and a repair node 434. Node module 432 further includes a bundle-type data structure 436 that holds a token that indicates the node's membership in a valid cluster and the cluster's bundle-type. A brand may beis obtained when a node successfully joins a correctly licensed cluster.

Node module 432 may further include a transfer license holder data structure 438. In one embodiment, transfer license holder data structure 438 may provide a temporary location for a Right-to-Use License and a Node License pool associated with a cluster that is decommissioned. The transfer license holder data structure provides a way to reconfigure a clustered computing system without having to re-enter license keys. Algorithms associated with the Transfer License Holder insure that transfer cannot result in more than one usable copy of the license.

Figure 5:
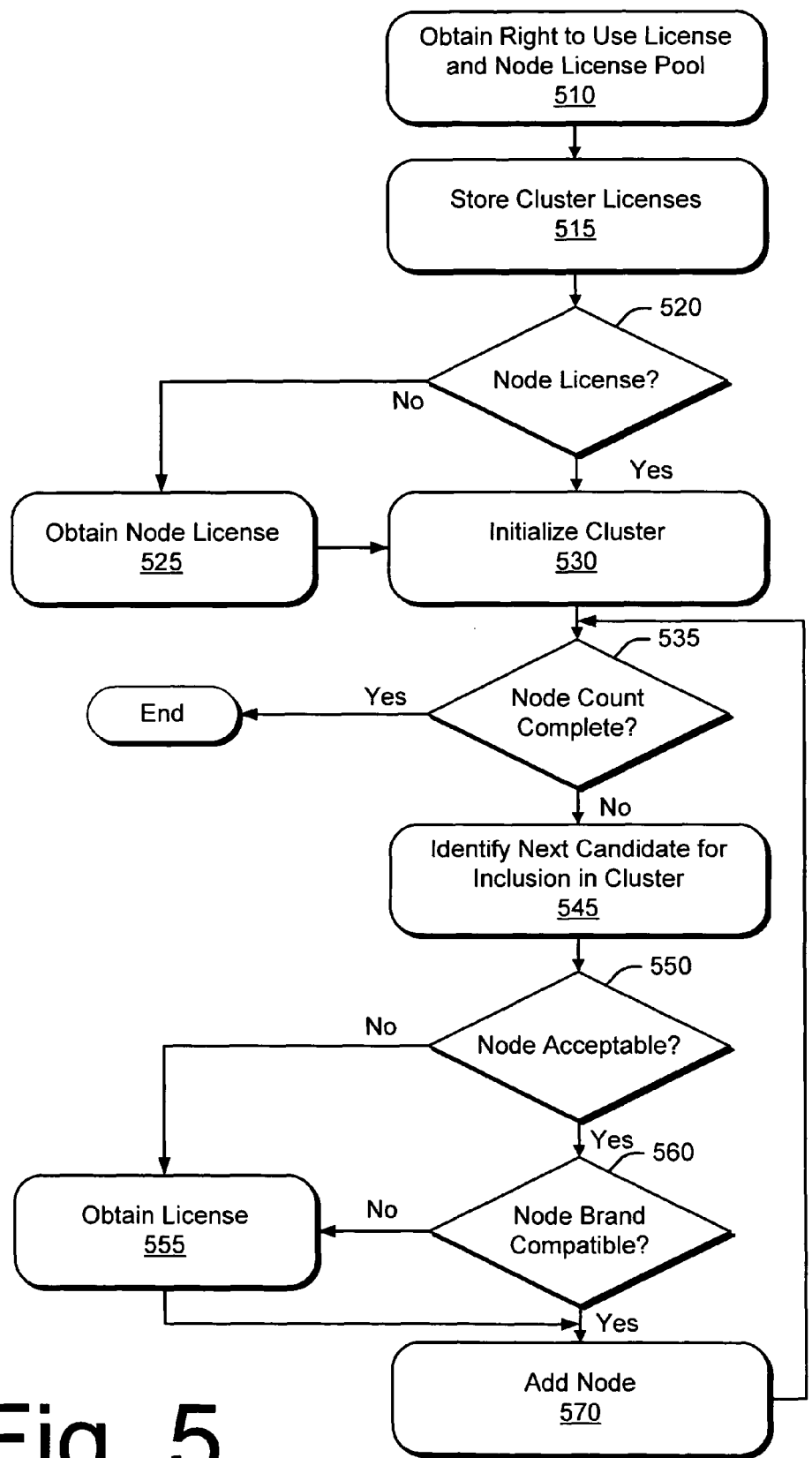
FIG. 5 is a flowchart illustrating operations in a method for creating a clustered computing system according to an embodiment.

FIG. 5 is a flowchart illustrating operations in a method for creating an initial clustered computing system according to an embodiment. Referring to FIG. 4 and FIG. 5, at operation 510 a Right-to-Use License 422 and a Node License pool 424 are established, for example via the initial bundle parameters as determined based on which the bundle is to satisfy. Right-to-Use and Node license(s) may be acquired using a key provided through initial sale of the bundle that is entered through external management control software. Referring briefly to FIG. 4, in one embodiment, a management module 450 may include an external management control module 452 and an external license server access module 454 that provide an interface with an external license server 460. A license key may be passed to a license server via the external license server access software. The license server returns a detailed right to use license 422 and Node License pool 424 information associated with the bundle key. A node that was not part of the original bundle SKU may be included in an initial cluster If the node has a license that posses a characteristic known as an "Add-on". This licenses characteristic may also be obtained via the license server.

At operation 515 the license clusters, which may correspond to the pools described above, are stored. In one embodiment, the Right-to-Use License and the Node License pool may be stored in the transfer license holder data structure in the node which originated the license request. The licensing information may be stored in the memory 318 of one or more array controllers 310 in a cluster 230, 240, 250. The memory module 318 may be a non-volatile memory such that the licensing information remains intact in the event that the array controller 310 loses power or fails.

If, at operation 520, the node that initiated the license request does not have a node license of its own and there are licenses left in the node license pool, then one of the node licenses may be conferred to the node receiving the management command. Operation 525 may be done in two phases. In the first phase the node license pool may be updated to associate a unique identifier (e.g., a serial number) with the node that is assigned the license. In the second phase, the node may be "branded" as a licensed node having a specific bundle type, e.g., by writing a token to a protected non-volatile memory location on the node. The node license may then be assigned specifically to the node (and may not be assigned to any other node). Control may then pass to operation 530, described below.

By contrast, if at operation 520 the node has a node license that matches one or more required parameters, then control passes to operation 530 and the cluster may be initialized. In one embodiment, the cluster may be initialized with as few as one member, i.e., the node that received the management command to create the cluster. The Right-to-Use License and the node license pool may be transferred to the newly created single node cluster, a node count parameter may be initialized (i.e., set to 1).

If, at operation 535, the node count for the cluster has reached a limit specified in the Right-to-Use license (or if there are no more candidate nodes), the cluster formation process is complete and the process ends. By contrast, if at operation 535 the node count for the cluster has not been reached. (i.e., if the cluster has not yet activated a number of nodes authorized by the license terms), then control passes to operation 545 and a next candidate node for inclusion in the cluster may be identified. This can be done using any number of techniques common in the art.

At operation 550 the candidate node's acceptability is evaluated. In one embodiment evaluating the node's acceptability at operation 550 encompasses operations 620-635, described with reference to FIG. 6. If the candidate node is unacceptable (i.e., if the node is new or otherwise fails an acceptability test), then control passes to operation 555 and a license is obtained for the candidate node. In one embodiment, a license may be obtained as described in connection with operation 525. In the event that a license cannot be obtained an error routine may be invoked.

By contrast, if at operation 550 the node is acceptable, then control passes to operation 560 and it is determined whether the node's brand is compatible with the cluster as defined by the Right-To-Use characteristics. In one embodiment, if the node has a brand which indicates that the node is no longer part of a different cluster (i.e., if the node has been released from a different cluster) and if its brand is valid for inclusion in this cluster's bundle-type (for example, lower class bundle types cannot join a cluster with a higher class bundle-type, but the reverse is true, e.g., higher class nodes can join lower class clusters), then no additional node license needs to be conferred on the node from the cluster's node license pool. This embodiment allows nodes to be moved between clusters provided both node and cluster bundle-types are compatible.

In another embodiment the candidate node may require an additional license from the cluster's node license pool. In this embodiment, movement of nodes between clusters requires re-licensing the node such as upgrade from a lower-class to a higher-class node. Hence control may pass to operation 555 and the candidate node may be licensed.

Control then passes to operation 570 and the candidate node may be added to the cluster. Control then returns to operation 535. Thus, operations 535-570 define a loop which may be repeated to construct a clustered computing system. In one embodiment a final test may be performed to ensure that the cluster includes the minimum number of nodes before initializing the cluster services and proceed with normal operations. This closed-loop precludes adding nodes that have a questionable lineage such as, e.g., gray market nodes.

Figure 6:
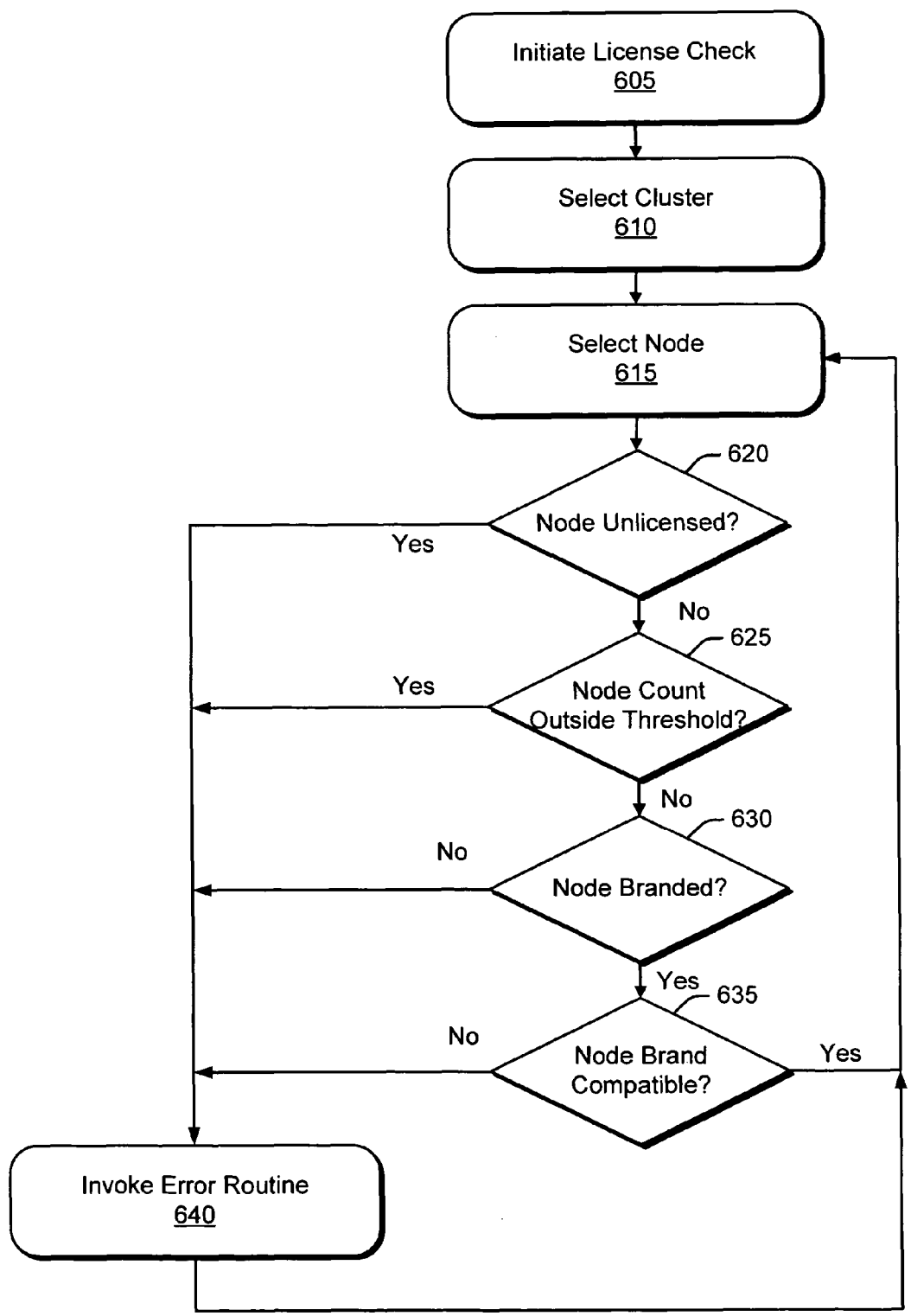
FIG. 6 is a flowchart illustrating operations in a method for performing a license check in a clustered computing system according to an embodiment.

FIG. 6 is a flowchart illustrating operations in a method for performing a license check in a clustered computing system according to an embodiment. In one embodiment, a license check may be executed on a periodic basis. In alternate embodiment, a license check may be event driven. For example, a license check may be implemented when a cluster bootstraps to insure that all nodes are properly licensed for the cluster.

Referring to FIG. 6, a license check is initiated at operation 605, at operation 610 a first cluster is selected, and at operation 615 a first node in the cluster is selected. If, at operation 620, the selected node is not properly licensed, e.g., if a node's license is expired or if the node brand is incompatible with type of cluster in which the node is placed, then control passes to operation 640 and an error routine may be invoked. In one embodiment, the error routine may include generating a warning signal that may be displayed on a user interface such as, e.g., a display or the like. In another embodiment, the error routine may include disabling the node, or disabling the entire cluster. By contrast, if at operation 620 the node is properly licensed, then control passes to operation 625.

If, at operation 625, the node count in the cluster is outside a threshold, then control passes to operation 640 and the error routine is invoked as described above. In one embodiment operation 625 also happens in the initial cluster generation and subsequently with every newly attempted node addition. In one embodiment, the threshold may include at least one of a lower limit on a number of nodes in a cluster and an upper limit on a number of nodes in a cluster. By contrast, if at operation 625, the node count in the cluster is within the threshold values, then control passes to operation 630.

If, at operation 630, a node is not branded, then control passes to operation 640 and the error routine is invoked as described above. In one embodiment, an unbranded node may indicate that the node is new and needs to be licensed, either through a cluster creation process or through a process of adding a node to an existing cluster. By contrast, if at operation 630, the node is branded, then control passes to operation 635.

If, at operation 635, a node brand is not compatible with the brand of the cluster, then control passes to operation 640 and the error routine is invoked as described above. For example, a node may be branded to work only within clusters having fewer than a specific number of nodes. By contrast, if at operation 635, the node brand is compatible with the cluster brand, then control passes to operation 615 and another node is selected. Thus, operations 615-635 define a loop by which nodes in a cluster may be evaluated for compliance with licensing and/or compatibility enforcement terms. The operation terminates if, at operation 615, there are no more nodes to evaluate.

A cluster may be expanded by adding one or more nodes to the cluster. In one embodiment, nodes may be added to a cluster using the operations 545-570 described in FIG. 5. The cluster must have an unassigned node license in order for a node with no bundle-type (i.e. a new, un-initialized node) to be added. The unassigned license may be an Add-on license purchased with an Add-on node, or an unassigned base bundle license that came with the original SKU.

A node may be unable to retain its bundle-type brand due to, e.g., a hardware failure or the like. In one embodiment, the repair node module 434 permits a user such as an administrator to reinstate a node license lost due to failure. Repair node module 434 provides the ability to cross-reference node licenses in the cluster against the cluster's original license(s). This generally involves access to the license server.

A cluster's Right-to-Use license 422 may be upgraded, e.g., by launching an upgrade inquiry with the external license server 460. When this occurs the Right-to-Use license can be updated to reflect new characteristics such as maximum and minimum node count thresholds, and additional node licenses can be added to the node license pool. Similarly, bundle-type brands can be upgraded on nodes given that the necessary fees have been paid and the licenses can be authenticated. After either of these upgrades operations 545-570 of the cluster creation process may be repeated to account for nodes that can be added to the cluster.

When a cluster is operational its license information may be stored redundantly on multiple nodes within the cluster. When a cluster is de-commissioned its license information may be stored in a node's transfer license holder 438 as a convenient way of transferring the licensing information to a new cluster. In one embodiment, the node which stores the license information may be the initial node in the new cluster. Hence, the cluster creation can effectively begin at operation 530. If the node fails so that the transfer license is lost, then the node may be reinstated using node repair techniques.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method of creating a clustered computing system, comprising:
    storing license information for a computing cluster in a memory module associated with a computing node, wherein the licensing information includes a bundle-type parameter that identifies a size of the cluster and at least one additional bundle-type characteristic of the cluster, and one or more node license parameters that identifies a characteristic of a computing node;
    initializing the computing cluster in a first computing node;
    adding one or more available computing nodes to the computing cluster; and
    activating the computing cluster when the computing cluster includes a number of nodes that complies with the bundle-type parameter.

2. The method of claim 1, wherein storing license information for a computing cluster in a memory module associated with a computing node comprises retrieving licensing information from an external licensing server.

3. The method of claim 1, wherein the bundle-type parameter identifies at least one of a minimum or maximum node count threshold for the computing cluster.

4. The method of claim 1, wherein: the node license parameters identify one or more bundle-types compatible with the computing node.

5. The method of claim 1, wherein adding one or more available computing nodes to the computing cluster comprises assigning a computing node a new node license when the computing node license is incompatible with a brand-type associated with the computing cluster.

6. The method of claim 1, further comprising initiating a license check while the computing system is operating, wherein the license check evaluates at least one of: a license status of the computing node; a node count in the computing cluster; and a brand-type associated with the computing node.

7. The method of claim 1, wherein the license check comprises implementing an error routine that inhibits operation of the computing node when an incompatibility between the computing node and the computing cluster is detected.

8. The method of claim 1, further comprising adding a computing node to the activated computing cluster.

9. A computing system comprising at least two computing nodes, wherein at least one of the computing nodes comprises:
    a cluster module stored on a non-transitory computer readable medium, the cluster module configured to manage compatibility operations associated with a computing cluster, the cluster module initializing a computing cluster in the first computing node, the cluster module adding one or more available computing nodes to the computing cluster;
    a node module stored on a non-transitory computer readable medium, the node module configured to manage compatibility operations associated with the at least two computer nodes, the node module storing license information for the computing cluster, wherein the licensing information includes a bundle-type parameter that identifies a size of the computing cluster and at least one additional bundle-type characteristic of the computing cluster, and one or more node license parameters that identifies a characteristic of a first computing node; and
    a management module stored on a non-transitory computer readable medium, the management module configured to manage compatibility operations with one or more external servers, the management module activating the computing cluster when the computing cluster includes a number of nodes that complies with the bundle-type parameter.

10. The computing system of claim 9, wherein the cluster module comprises a create cluster module to aggregate the at least two computing nodes into a clustered computing system.

11. The computing system of claim 10, wherein the cluster module maintains a right to use license comprising licensing information for a computing cluster and a node license pool comprising licensing information for nodes in the computing cluster.

12. The computing system of claim 10, further comprising an add node module to add a computing node to the clustered computing system.

13. The computing system of claim 10, wherein the management module provides a license key to and receives licensing information from an external licensing server.

14. A computer program product comprising logic instructions stored on a non-transitory computer-readable medium which, when executed by a computer processor, configure the processor to:
- store license information for a computing cluster in a memory module associated with a computing node, wherein the licensing information includes a bundle-type parameter that identifies a size of the cluster and at least one additional bundle-type characteristic of the cluster, and one or more node license parameters that identifies a characteristic of a computing node;
- initialize the computing cluster in a first computing node;
- add one or more available computing nodes to the computing cluster; and
- activate the computing cluster when the computing cluster includes a number of nodes that complies with the bundle-type parameter.

15. The computer program product of claim 14, further comprising logic instructions which, when executed by the processor, configure the processor to retrieve licensing information from an external licensing server.

16. The computer program product of claim 14, further comprising logic instructions which, when executed by the processor, configure the processor to assign a computing node a new node license when the computing node license is incompatible with a brand-type associated with the computing cluster.

17. The computer program product of claim 14, further comprising logic instructions which, when executed by the processor, configure the processor to initiate a license check while the computing system is operating, wherein the license check evaluates at least one of:
- a license status of the computing node;
- a node count in the computing cluster; and
- a brand-type associated with the computing node.

18. The computer program product of claim 14, further comprising logic instructions which, when executed by the processor, configure the processor to implement an error routine that inhibits operation of the computing node when an incompatibility between the computing node and the computing cluster is detected.

* * * * *